(12) United States Patent
Ho et al.

(10) Patent No.: US 9,971,723 B2
(45) Date of Patent: May 15, 2018

(54) DEVICE AND SYSTEM FOR BRIDGING ELECTRICAL SIGNALS BETWEEN SIM CARD AND MOBILE DEVICE AND PROVIDING SERVICE TO MOBILE DEVICE

(71) Applicant: Taisys Technologies Co., Ltd., Taipei (TW)

(72) Inventors: Chun-Hsin Ho, Taipei (TW); Ching-Kuang Han, Taipei (TW)

(73) Assignee: Taisys Technologies Co. Ltd., Taipei (TW)

( * ) Notice: Subject to any disclaimer, the term of this patent is extended or adjusted under 35 U.S.C. 154(b) by 0 days. days.

(21) Appl. No.: 14/632,513

(22) Filed: Feb. 26, 2015

(65) Prior Publication Data

US 2016/0255183 A1 Sep. 1, 2016

(51) Int. Cl.
*H04M 1/00* (2006.01)
*H04B 1/38* (2015.01)
*G06F 13/40* (2006.01)

(52) U.S. Cl.
CPC .............................. *G06F 13/4027* (2013.01)

(58) Field of Classification Search
CPC .. H04M 1/0249; G06F 13/4027; H04W 8/183
USPC ................. 455/558, 411, 433, 551
See application file for complete search history.

(56) References Cited

U.S. PATENT DOCUMENTS

| | | | | |
|---|---|---|---|---|
| 6,387,027 B1* | 5/2002 | Bodin | ................... | H04W 8/183 455/419 |
| 6,601,770 B1* | 8/2003 | Ikefuji | ................. | G06K 7/0008 235/441 |
| 6,607,127 B2* | 8/2003 | Wong | ................. | G06K 7/10336 235/380 |
| 6,811,082 B2* | 11/2004 | Wong | ................. | G06K 7/10336 235/451 |
| 6,851,606 B2* | 2/2005 | Maenpaa | ................. | H04W 8/18 235/375 |
| 7,188,199 B2* | 3/2007 | Leung | ................. | H03M 1/1057 341/118 |
| 7,188,777 B2* | 3/2007 | Yamagata | ............. | G06F 13/385 235/441 |
| 7,198,199 B2* | 4/2007 | Ho | ......................... | G06K 19/07 235/441 |
| 7,252,242 B2* | 8/2007 | Ho | ......................... | G06K 19/07 235/487 |
| 7,303,137 B2* | 12/2007 | Ho | ......................... | G06K 19/07 235/449 |
| 7,454,233 B2* | 11/2008 | Lu | ......................... | H04W 92/08 455/407 |
| 7,866,564 B2* | 1/2011 | Ho | ....................... | G06K 19/073 235/435 |

(Continued)

*Primary Examiner* — Marceau Milord
(74) *Attorney, Agent, or Firm* — Che-Yang Chen; Law Offices of Scott Warmuth

(57) ABSTRACT

A device and a system for bridging electrical signals between a SIM card and a mobile device and providing a service to the mobile device are disclosed. The system includes: a SIM card interface, for electrically connecting with contacts of a SIM card; a mobile device interface, for electrically linking to a circuit of a mobile device, further connecting to a processor of the mobile device; and a secure element, for bridging electrical signals between the SIM card interface and the mobile device interface, and providing an application corresponding to a request from the processor of the mobile device.

11 Claims, 5 Drawing Sheets

(56) References Cited

U.S. PATENT DOCUMENTS

| | | | | |
|---|---|---|---|---|
| 8,494,486 B2* | 7/2013 | Roundtree | ............. | G06F 21/62 |
| | | | | 455/410 |
| 8,532,706 B2* | 9/2013 | Kaul | ................... | G06K 7/0013 |
| | | | | 455/558 |
| 8,544,755 B2* | 10/2013 | Bidin | .............. | G06K 19/07745 |
| | | | | 235/487 |
| 8,660,533 B2* | 2/2014 | Khan | ................. | H04L 63/0876 |
| | | | | 455/410 |
| 8,977,195 B2* | 3/2015 | Levy | ................ | G06K 7/10237 |
| | | | | 455/41.1 |
| 9,131,364 B2* | 9/2015 | Howard | ................. | H04W 8/22 |
| 9,247,425 B2* | 1/2016 | Nousiainen | ......... | H04L 63/0853 |
| 9,357,378 B1* | 5/2016 | Delker | ................. | H04W 4/001 |
| 9,609,506 B2* | 3/2017 | Duchan | ................ | H04W 8/183 |
| 2002/0168900 A1* | 11/2002 | Chen | ................... | G06K 7/0021 |
| | | | | 439/630 |
| 2004/0129785 A1* | 7/2004 | Luu | ...................... | G06K 7/0034 |
| | | | | 235/486 |
| 2005/0231921 A1* | 10/2005 | Noda | .................. | G06K 7/0021 |
| | | | | 361/737 |
| 2010/0093396 A1* | 4/2010 | Roundtree | ....... | H04M 1/72522 |
| | | | | 455/558 |
| 2012/0052801 A1* | 3/2012 | Kulkarni | ............. | G06K 7/0008 |
| | | | | 455/41.1 |
| 2012/0178366 A1* | 7/2012 | Levy | ................ | G06K 7/10237 |
| | | | | 455/41.1 |
| 2016/0078434 A1* | 3/2016 | Huxham | .............. | G07F 19/204 |
| | | | | 705/71 |

\* cited by examiner

DEVICE AND SYSTEM FOR BRIDGING ELECTRICAL SIGNALS BETWEEN SIM CARD AND MOBILE DEVICE AND PROVIDING SERVICE TO MOBILE DEVICE

FIELD OF THE INVENTION

The present invention relates to a device and a system for bridging electrical signals. More particularly, the present invention relates to a device or system for bridging electrical signals between a SIM card and a mobile device and providing a service to the mobile device.

BACKGROUND OF THE INVENTION

Secure element is a module on a mobile phone. It is used to install multiple applications for that mobile phone. The application may run for payment service, secure storage or provide another SIM in the mobile phone (dual SIM function). Functions of the secure element are consistent with that of the existing smart cards for multi-application platforms. In order to communicate with the phone. The secure element usually contains an operating system, a device interface, and an antenna interface. The operating system enables the application to be safely executed, stored and managed. The device interface provides communication between the secure element and the mobile phone by commands and responses of an APDU (Application Protocol Data Unit) in the UICC (Universal Integrated Circuit Card) while the antenna interface provides communication between the secure element and an external contactless reader by commands and responses of the APDU through a contactless module in the mobile phone. With the secure element, the mobile phone can install applications which need higher secure requirements in the UICC, such as a debit card service.

There are three ways that the secure element can be designed into a mobile phone. It is to be built in the UICC, embedded in a specified IC, and stored in one micro SD card inserted into the mobile phone. For the first way, secure elements built on the UICC can be seen as a SIM card of the phone (in fact SIM is just one function of the UICC). General mobile phones can support this function. It is the solution that has a high level of standardization for its better interoperability. The second method makes the secure element easy to be applied on the mobile phone. The only defect is that the portability is low. However, an advantage is that no matter which mobile network operator provides telecommunication services to the mobile phone user, the applications and personalization data in the secure element can still be kept in the mobile phone. If the secure element is stored in the micro SD card, users' actions are judged to access the secure element or the general memory by a controller of the micro SD card. Currently, not all of the mobile phones can support this way and standards are still under development. There may be problems about interoperability.

There is a trend that mobile network operators would like to cooperate with smartphone makers to build in their customized services, e.g. services of prepayment, into new models of smartphones. In the processes of manufacturing a smartphone, it is not practical to modify the microprocessor of the smartphone. A customized microprocessor may be too expensive in cost and too technical in design for the mobile network operator. A best solution is to put the applications of services in the secure element before users buy the smartphone along with the applications.

Come back to the three ways to see what can benefit the requirement. If the secure element is built in the UICC, it would be convenient to implement. However, memory in the UICC may not be large enough to carry so many data. On the other hand, the mobile network operator would not appreciate this solution since the UICC they provide may be replaced by other competitor's due to another attractive solution or application built in the competitor' UICC. Any mobile network operator wants their customers be loyal to them with a unique hardware and their applications for a long term business. This way can not meet the expectation. If the secure element is built in the specified IC, it would be the best way to fulfill the mobile network operator's requirement. The problems may be that the mobile network operator has to find a programmable IC which is very tiny and the I/O conforms to SIM card's specification. Meanwhile, cooperation with the smartphone maker is a must to co-design the IC on the PCB. A third party could not be able to provide a service bridging both sides. As to install the secure element in the micro SD card, since there is no standard ready, it is not a good solution yet.

Hence, in order to fulfill the requirements from the mobile network operator, a device or system or device which can safely store the application of the services, have good interoperability, and simply be designed and mounted onto the PCB of a smartphone (or all mobile phones), is desired. This is the reason the inventor came up the system for bridging a SIM card and a mobile device and providing a service to the mobile device through a secure element.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirements mentioned above, a device is disclosed. The device can bridge electrical signals between a SIM card and a mobile device, provide a service to the mobile device, and provide an application corresponding to a request from a processor of the mobile device. The protocol of the electrical communication between the device and the processor of the mobile device conforms to the protocol of the electrical communication between the device and the SIM card. The mobile device is a mobile phone or a tablet. The application runs to provide a customized service which is not a function defined by the SIM. The device is electrically connected between a modem module of the mobile device and the SIM card. The device is a secure element in the form of an Integrated Circuit (IC).

The present invention further provides a system for bridging electrical signals between a SIM card and a mobile device and providing a service to the mobile device. The system includes: a SIM card interface, for electrically connecting with contacts of a SIM card; a mobile device interface, for electrically linking to a circuit of a mobile device, further connecting to a processor of the mobile device; and a secure element, for bridging electrical signals between the SIM card interface and the mobile device interface, and providing an application corresponding to a request from the processor.

Preferably, the mobile device is a mobile phone or a tablet. The protocol of the electrical communication between the secure element and the processor conforms to the protocol of the electrical communication between the device and the SIM. The application runs to provide a customized service which is not a function defined by the SIM. The customized service is service of mobile payment management, secure storage in the secure element, telecommunication of another SIM card, mobile banking, service of membership card, or service of authentication. The SIM card interface has a form of a SIM card slot and the SIM card is able to be inserted into and held therein. The system is electrically connected between a modem module of the mobile device and the SIM card. The secure element is in the form of an Integrated Circuit (IC).

The system further includes a Printed Circuit Board (PCB), for forming a circuit to link to the SIM card interface, the mobile device interface, and the secure element, and for fixing the elements mentioned thereon.

DETAILED DESCRIPTION OF THE PREFERRED EMBODIMENTS

The present invention will now be described more specifically with reference to the following embodiments.

First Embodiment

Figure 1:
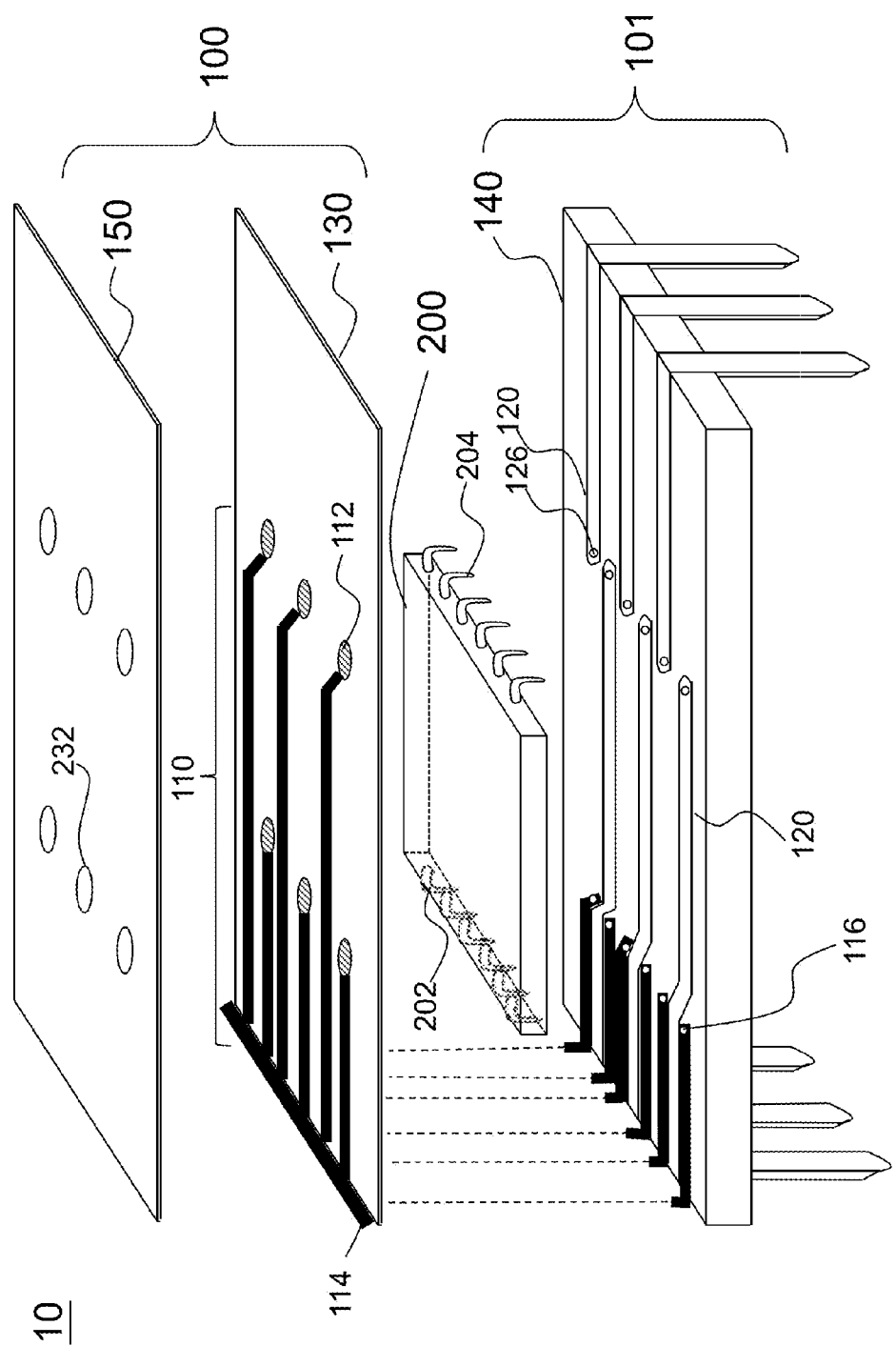
FIG. 1 is a schematic diagram of a system for bridging electrical signals between a SIM card and a mobile device and providing a service to the mobile device according to the present invention.
Figure 2:
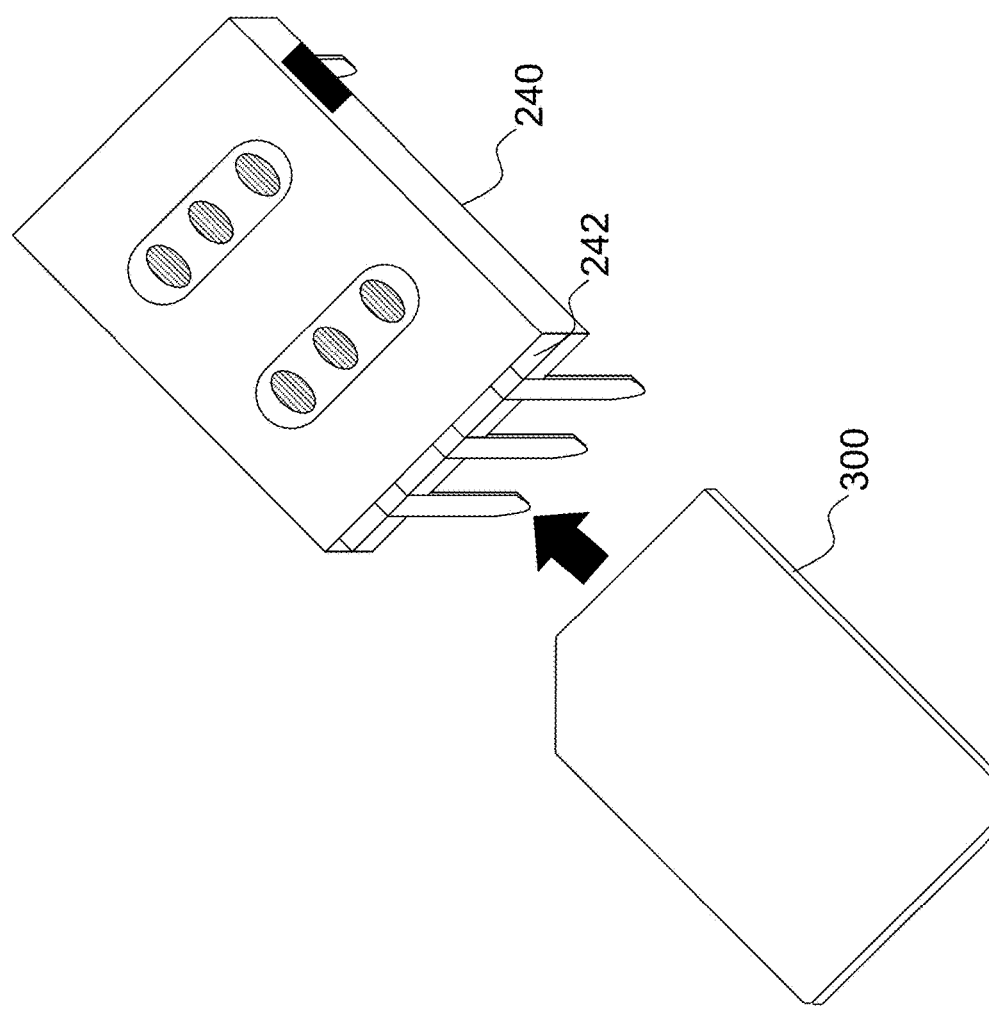
FIG. 2 illustrates application of the system.

Please refer to FIG. 1 and FIG. 2. A first embodiment of a system 10 used for bridging electrical signals between a SIM card and a mobile device and providing a service to the mobile device according to the present invention is disclosed. The SIM card used in the system 10 may be any type, e.g. a mini-SIM card (2FF), a micro-SIM card (3FF), or a nano-SIM card (4FF). The SIM card may only carry information for mobile phone, such as a unique serial number (ICCID), international mobile subscriber identity (IMSI), secure authentication, ciphering information, temporary information related to the local network, a personal identification number (PIN) for ordinary use and a personal unblocking code (PUK) for PIN unlocking. The left space is not enough to install software of a distinctive, customized service. The said customized service is any functions but not the one defined by the SIM. By applying the system 10, an application can run and be shown in the mobile device and/or interact with external apparatus according to requests from a user to provide the customized service. The application may be programmed by a specified programming language or performed by a combination of applets used by a secure element. Preferably, the mobile device is a mobile phone (smart phone) or a tablet. Therefore, there would be a touch screen for the user to interact with the secure element, further initiating the customized service.

The system 10 basically includes three major parts: a SIM card interface 100, a mobile device interface 101 and a secure element 200. The SIM card interface 100 is able to electrically connect with contacts of a SIM card 300 (please refer to FIG. 2). The SIM card interface 100 has at least six first circuitry connecting structures 110. The first circuitry connecting structure 110 is used for electrically connecting to contacts of the SIM card 300, respectively. In order to achieve the above goal, each circuitry connecting structure 110 is composed of a contact portion 112 and a connecting portion 114. The contact portion 112 is a metal terminal, located on a first board 130 of the SIM card interface 100. The connecting portion 114 is a metal wire. One end of the connecting portion 114 is linked to the contact portion 112. Partial connecting portion 114 is fixed on the first board 130, partial connecting portion 114 is fixed on a second board 140 of the mobile device interface 101 below the first board 130, and the rest is bridging thereinbetween (shown by dashed lines). The contact portion 112 and connecting portion 114 may also be made integratedly. Namely, the contact portion 112 and connecting portion 114 may be made from punching a piece of cooper plate and the contact portion 112 is formed a protrusion. It should be noted that on the other end of each circuitry connecting structure 110, there is a first hole 116 formed. From FIG. 1, it is clear that the first hole 116 is on the second board 140.

The SIM card interface 100 has a third board 150 located above the first circuitry connecting structures 110 and the second board 140. The third board 150 has six through holes 232. Each through hole 232 faces one contact portion 112, respectively. The contact portion 112 is extended toward the through hole 232 and protruded from the through hole 232. Functionally, the SIM card interface 100 is a SIM card slot and the SIM card is able to be inserted into and held on the SIM card slot. The SIM card 300 contacts with the SIM card interface 100 with each contact on the SIM card 300 contacting corresponding contact portion 112 and the body of the SIM card 300 is close to the third board 150.

The mobile device interface 101 can electrically link to a circuit of the mobile device, further connecting to a processor (not shown) of the mobile device. The mobile device interface 101 has at least six second circuitry connecting structures 120. The second circuitry connecting structure 120 is used for electrically connecting to the processor. Not like the first circuitry connecting structure 110, the second circuitry connecting structure 120 in two groups and placed on two side of the SIM card interface 100. A second hole 126 is formed on one end of each second circuitry connecting structure 120. As shown in FIG. 1, the second holes 126 of the six second circuitry connecting structures 120 are arranged in one line. The other end of the second circuitry connecting structure 120 forms a pin. Thus, the SIM card interface 100 can use the six pins to fix onto a PCB of the mobile device. As mentioned above, the SIM card interface 100 is a SIM card slot. Thus, the number pins interfacing the PCB is not limited to 6. It there is any requirement about extra signals other than the signals from and to the SIM card, more pins are workable. The first board 130, the second board 140 and the third board 150 are able to integrate as one fixture. The fixture can arrange the first circuitry connecting structures 110 and the six second circuitry connecting structures 120.

The secure element 200 is in the form of an Integrated Circuit (IC). The secure element 200 can bridge electrical signals between the SIM card interface 100 and the mobile device interface 101. It can also provide the application corresponding to a request from the processor of the mobile device. The secure element 200 may have many pins. Among these pins, there should be some left for the above goals. In this embodiment, they are six first pins 202 and six second pins 204. The first pins 202 are electrically connected to the first holes 116, respectively. The first pins 202 are used to provide electrical signals between the secure element 200 and the SIM card 300. The second pins 126 are electrically connected to the second holes 126, respectively. The second pins 126 are used to provide electrical signals between the processor and the secure element 200.

The secure element 200 can provide some messages or services other than telecommunication provided by the SIM card 300. For example, the application from the secure element 200 run to provide a service of mobile payment management, secure storage in the secure element 200, telecommunication of another SIM card, mobile banking, service of membership card, or even service of authentication. Therefore, the protocol of the communication between the secure element 200 and the processor of the mobile device conforms to the protocol of the electrical communication between the mobile device and the SIM card. The application can be designed according to different OSs, for example, android or iOS.

Please refer to FIG. 2. It shows a physical appearance of the SIM card interface 100. A housing 240 encloses the system 10 is shown. The housing 240 can protect the first circuitry connecting structures 110, the second circuitry connecting structures 120, the fixture and the secure element 200 inside. Meanwhile, the SIM card 300 can be inserted into and held by a slot 242 of the housing 240 to co-work with the system 10. Since the SIM card interface 100 is in a form of a SIM card slot, in design of the mobile phone, the system 10 is electrically connected between a modem module of the mobile device and the SIM card.

For the end users, they want to keep the mobile device along with the customized service if they change mobile network operator (SIM card). Since the customized service is bundled in the secure element 200, it is workable. On the other hand, for the manufacturer of the mobile device, they can simply use the system 10 (or say the SIM card slot) on to the PCB. No more layout or design for the PCB is required. The application and service in the secure element 200 can be created by a third party and be applied to almost all kinds of new models of mobile devices as long as specs of their SIM card slot can be released.

Second Embodiment

Different from the previous embodiment, in a second embodiment, according to the spirit of the present invention, the SIM card interface is not necessary to be in the form of a SIM card slot. The system can be in the form of PCBA (Printed Circuit Board Assembly) and the SIM card slot is just a part thereon. The PCBA can be used to mount onto a main PCB of a mobile device.

Figure 3:
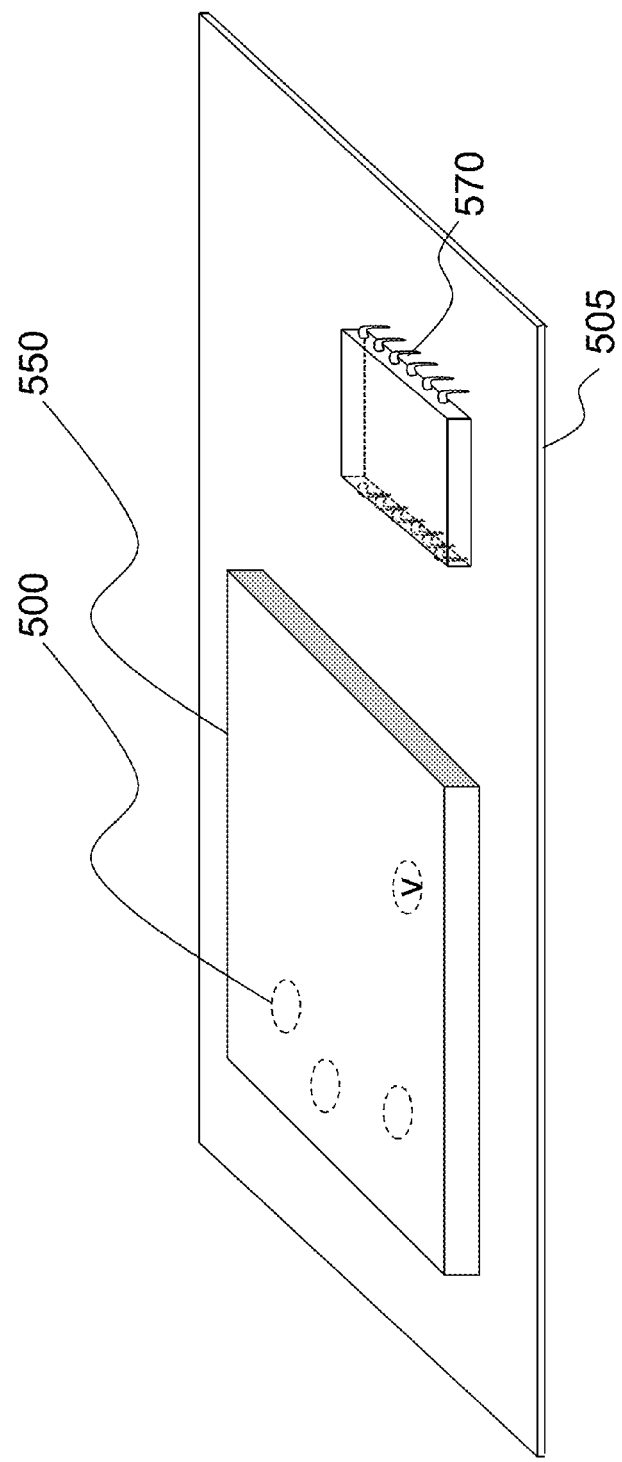
FIG. 3 a schematic diagram of another system for bridging electrical signals between a SIM card and a mobile device and providing a service to the mobile device according to the present invention.
Figure 4:
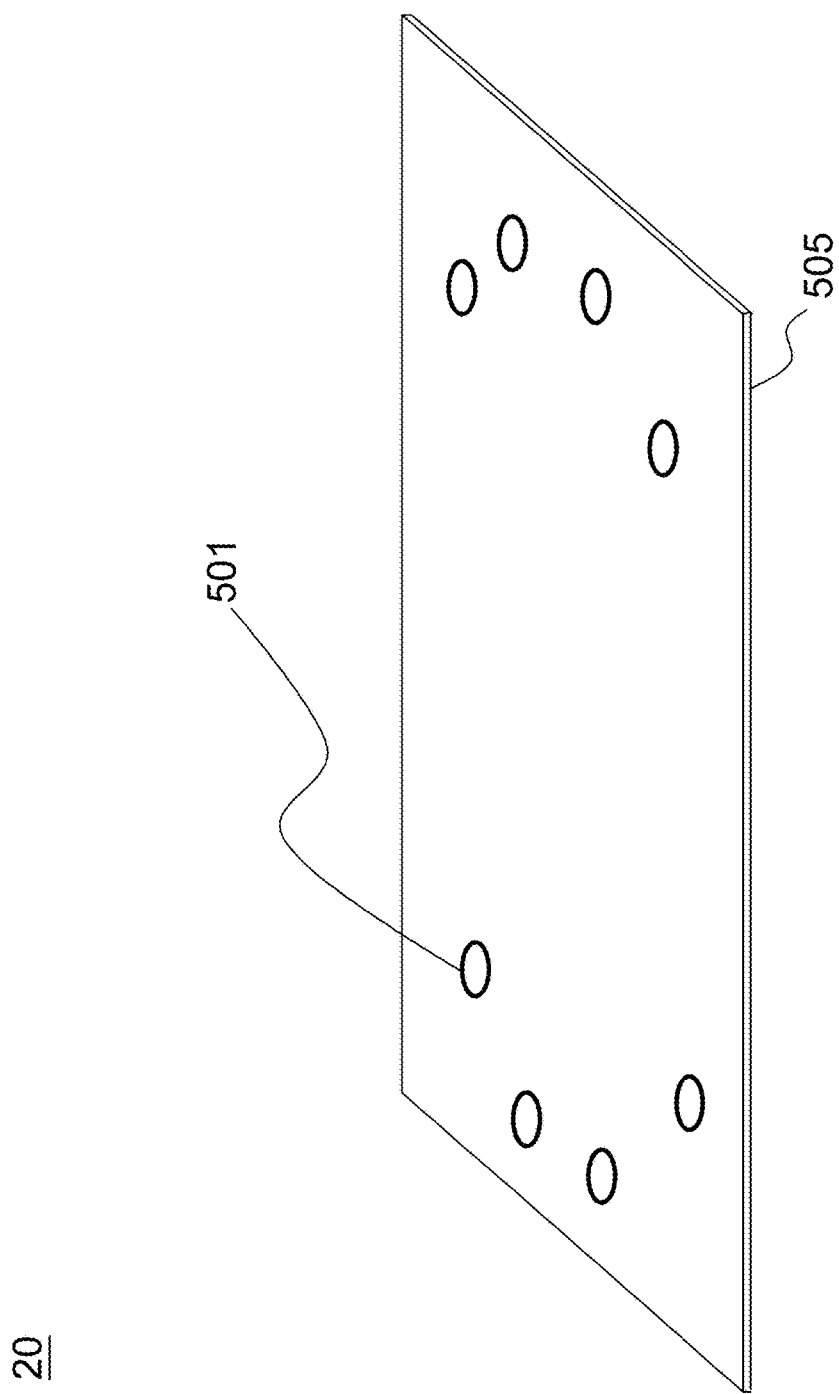
FIG. 4 is the other side of a PCB on another system.
Figure 5:
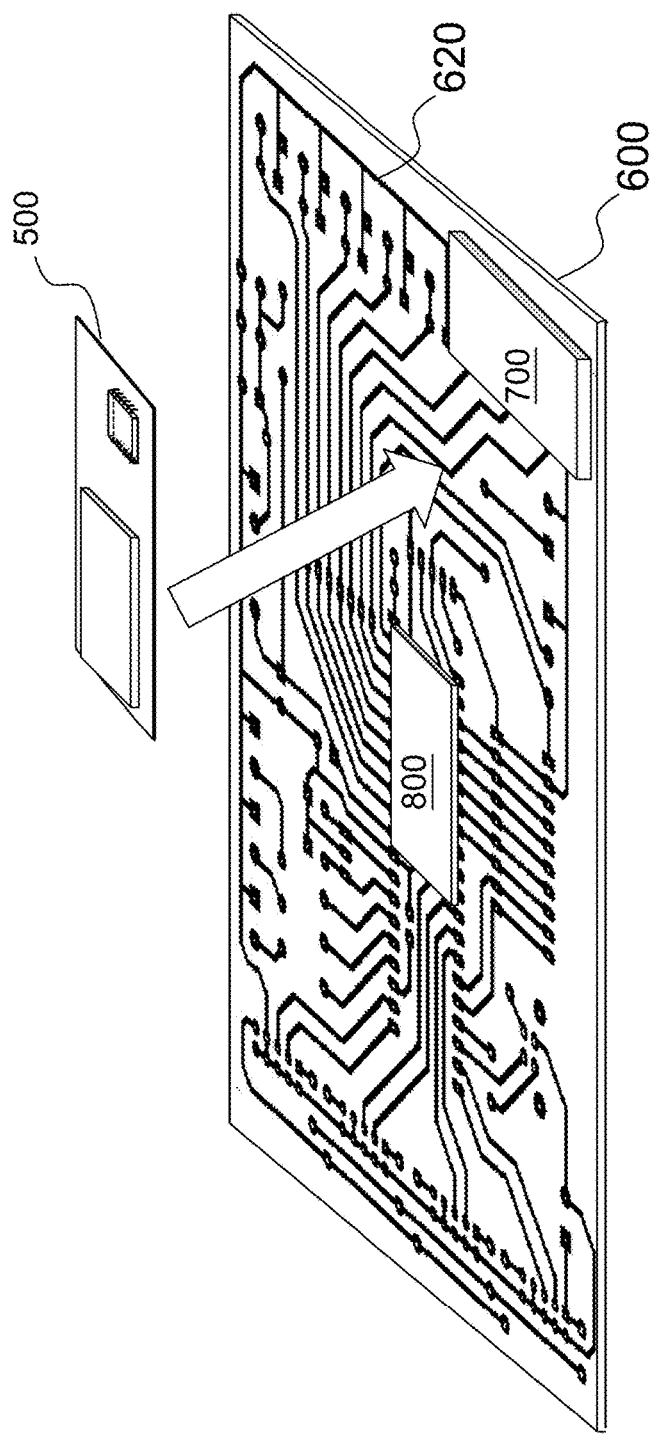
FIG. 5 illustrates application of the system.

Please refer to FIG. 3. Another system 20 for bridging electrical signals between a SIM card and a mobile device and providing a service to the mobile device is shown. The system 20 comprises a SIM card interface 500, a mobile device interface 501, a carrying PCB 505, a SIM card slot 550, and a secure element 570. The SIM card interface 500 can electrically connect with contacts of a SIM card through the SIM card slot 550 where the SIM card is inserted into. In fact, SIM card interface 500 may be a number of pads on the carrying PCB 505 and used to connect with and fix the SIM card slot 550. The SIM card interface 500 is shown in dashed circles because it is located between the SIM card slot 550 and the carrying PCB 505 and can not be seen directly. As shown in FIG. 4 and FIG. 5, the other side of the carrying PCB 505 has the mobile device interface 501. The mobile device interface 501 is used for electrically linking to a circuit 620 of a mobile device, further connecting to a processor 800 of the mobile device. Similarly, the mobile device interface 501 is a number of pads on the carrying PCB 505 and used to connect with and mount onto a main PCB 600 of the mobile device.

The secure element 570 is also in the form of an IC. It can be used for bridging electrical signals between the SIM card interface 500 and the mobile device interface 501. This is because a circuit of the carrying PCB 505 connects the lines linked the SIM card interface 500 and the lines linked the mobile device interface 501 to corresponding pins of the IC (secure element 570). It should be noticed that the number of lines connected between the SIM card interface 500 and the secure element 570 is not limited to 6. The number of lines connected between the mobile device interface 501 and the secure element 570 is also not limited to 6. As long as electrical signals between the SIM card interface 500 and the mobile device interface 501 can pass through the secure element 570 and the customized service can be provided, any number is workable (It means not all contacts of a SIM card would be utilized by the secure element 570). Design of the circuit is not the key point of the present invention. The secure element 570 can also provide the same application mentioned in the first embodiment corresponding to a request from the processor of the mobile device by a user. The carrying PCB 505 of the system 20 forms a circuit to link to the SIM card interface 500, the mobile device interface 501, the secure element 200, and the SIM card slot 550. It can fix the elements mentioned thereon.

The system 20 (PCBA) is mounted on the main PCB 600. The circuit 620 on the main PCB 600 connects the system 20 to a modem module 700. Therefore, the system stands between the SIM card (in the SIM card slot 550) and modem module 700. Communication between the SIM card and the modem module 620 is also available. Through the modem module 620, the circuit 620 can further connect the system 20 to the processor 800 of the mobile device. Advantage of this design is to utilize inner space of the mobile device.

Third Embodiment

According to the description above, it is obvious the key part in the previous embodiments is the secure element. Basically, the secure element (IC) can be directly used and mounted on a PCBA of a mobile device to bridge electrical signals between a SIM card and the mobile device, providing the service aforementioned to the mobile device. The mobile device may be a mobile phone or a tablet. It is important that the protocol of the electrical communication between the secure element and the processor of the mobile device conforms to the electrical communication between the device and the SIM card. The secure element in the logic circuit of the PCBA should electrically connected between the SIM card and a modem module (like modem module 700 in the second embodiment) of the mobile device.

Like the first embodiment, a customized service which is not a function defined by the SIM is provided by the secure element by running an application corresponding to a request from the processor of the mobile device. The request may be a signal to trigger the service.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A mediate device having a secure element in the form of an Integrated Circuit (IC) with a plurality of pins and a SIM card slot for bridging electrical signals between a SIM card and a mobile device, respectively, through the plurality of pins of the secure element which is placed outside the SIM card slot, providing a service to the mobile device, and providing an application corresponding to a request from a processor of the mobile device, wherein the protocol of the electrical communication between the mediate device and the processor of the mobile device conforms to the protocol of the electrical communication between the mediate device and the SIM card which is inserted and held in the SIM card slot.

2. The mediate device according to claim 1, wherein the mobile device is a mobile phone or a tablet.

3. The mediate device according to claim 1, wherein the application runs to provide a customized service which is not a function defined by the SIM.

4. The mediate device according to claim 1, wherein the mediate device is electrically connected between a modem module of the mobile device and the SIM card.

5. A system for bridging electrical signals between a SIM card and a mobile device and providing a service to the mobile device, comprising:
   a SIM card interface, for electrically connecting with contacts of a SIM card, wherein the SIM card interface has a SIM card slot for the SIM card to be inserted into and held therein;
   a mobile device interface, for electrically linking to a circuit of a mobile device, further connecting to a processor of the mobile device; and
   a secure element, in the form of an Integrated Circuit (IC), having a plurality of pins for bridging electrical signals between the SIM card interface and the mobile device interface, respectively, and providing an application corresponding to a request from the processor, wherein the secure element is placed outside the SIM card slot.

6. The system according to claim 5, wherein the mobile device is a mobile phone or a tablet.

7. The system according to claim 5, wherein the protocol of the electrical communication between the secure element and the processor of the mobile device conforms to the protocol of the electrical communication between the mobile device and the SIM card.

8. The system according to claim 5, wherein the application runs to provide a customized service which is not a function defined by the SIM.

9. The system according to claim 8, wherein the customized service is service of mobile payment management, secure storage in the secure element, telecommunication of another SIM card, mobile banking, service of membership card, or service of authentication.

10. The system according to claim 5, wherein the system is electrically connected between a modem module of the mobile device and the SIM card.

11. The system according to claim 5, further comprising a Printed Circuit Board (PCB), for forming a circuit to link to the SIM card interface, the mobile device interface, and the secure element, and for fixing the elements mentioned thereon.

* * * * *